United States Patent [19]

Sakata et al.

[11] Patent Number: 5,110,899
[45] Date of Patent: May 5, 1992

[54] SULFO-GROUP-CONTAINING HEAT-RESISTANT HIGH-MOLECULAR MATERIAL AND A PREPARATION PROCESS THEREOF

[75] Inventors: Koji Sakata; Kouji Sakawaki, both of Kitakyushu, Japan

[73] Assignee: Mitsui Mining Co., Ltd., Tokyo, Japan

[21] Appl. No.: 640,354

[22] PCT Filed: May 21, 1990

[86] PCT No.: PCT/JP90/00644
  § 371 Date: Jan. 22, 1991
  § 102(e) Date: Jan. 22, 1991

[87] PCT Pub. No.: WO90/14382
  PCT Pub. Date: Nov. 29, 1990

[30] Foreign Application Priority Data
  May 22, 1989 [JP] Japan ................. 1-126804

[51] Int. Cl.$^5$ ............................ C08G 16/02
[52] U.S. Cl. ...................... 528/265; 528/230
[58] Field of Search ................. 528/230, 265

[56] References Cited

U.S. PATENT DOCUMENTS 2,529,602 11/1950 Frohmader ............... 252/193
3,904,410 9/1975 Sakaguchi et al. ............ 96/1.5

Primary Examiner—Morton Foelak
Assistant Examiner—Richard Jones
Attorney, Agent, or Firm—Oblon, Spivak, McClelland, Maier & Neustadt

[57] ABSTRACT

Disclosed herein is a sulfo-group-containing heat-resistant high-molecular material containing sulfo groups in an amount of not less than 1 wt. % in terms of sulfur content and having an ammonia adsorptivity of not less than 10 mg/g, formed by heat-treating at a temperature of 250°–500° C. a starting composition composed mainly of a sulfo-group-containing aromatic high-molecular compound which comprises unit constituents of an aromatic sulfonic acid compound or a salt thereof and is soluble in aqueous solvents, and a preparation process thereof.

11 Claims, 3 Drawing Sheets

SULFO-GROUP-CONTAINING HEAT-RESISTANT HIGH-MOLECULAR MATERIAL AND A PREPARATION PROCESS THEREOF

TECHNICAL FIELD

This invention relates to a sulfo-group-containing heat-resistant high molecular material which has a high heat resistance and a large specific surface area and which can be used in a wide variety of fields such as adsorbents, deodorants, filter media and flame retardants.

BACKGROUND ART

Among various high-molecular materials which are industrially useful, carbon materials are excellent generally in such characteristics as heat resistance, corrosion resistance and lubricating property. Further, since they can be imparted with a variety of functions by the adequate control of production conditions and additional treatment conditions, they are being used in various fields as fibers or moldings of desired shapes depending on the individual use purposes.

Of these carbon materials, fibrous materials are usually produced by heat-treating their precursor fibers to make them infusible, followed by carbonization and graphitization at higher temperatures. However, this process involves complex production steps and moreover requires carbonization and graphitization treatments at high temperatures, so that the resulting carbon materials are relatively expensive and therefore have had limited uses in spite their excellent characteristics. Hence, in the field where high strength or high-temperature heat resistance is not particularly demanded, it has been proposed to use fibrous carbon materials in the form of so-called flame resistant fibers which are not completely carbonized, formed by burning organic fibers at comparatively low temperature.

Further, it has been attempted to introduce sulfo groups into organic high-molecular materials with a view to imparting functionalities to the materials. For instance, copolymers of styrene and divinylbenzene having sulfo groups introduced by means of sulfuric acid, chlorosulfonic acid, etc. have been used as cation exchange resins of strong acid type, and polystyrenes sulfonated by a similar method have been used as surface active agents. It has also been known to produce fibrous adsorbents by forming side chains, such as styrene, on a base material, such as polypropylene fiber, by radiation graft copolymerization and sulfonation of the resulting side chains.

It has been reported that among the above-described flame resistant fibers, those of polyacrylonitrile origin contain carbonyl groups of acridone type, and that active carbon fibers of high hydrogen sulfide adsorptivities can be obtained by activating them at 800°–1,000° C. However, the fibers do not have functionalities, such as absorptivity and ion exchange ability, when they have only undergone a flame resisting treatment of oxidation at 250°–300° C. Sulfonated products of styrene-divinylbenzene copolymers are insoluble in water but are partially soluble in organic solvents such as quinoline and DMSO. Sulfonate polystyrenes are also soluble in water. Moreover, these sulfonated polymers have low heat resistances of 100° C. or below as well as low strengths. Further, in the case of radiation graft copolymers, their preparation has to be done by a particular process using radiation and, in addition, the heat resistance of the resulting fibers is no more than that of the substrate fibers.

DISCLOSURE OF THE INVENTION

The object of the present invention is to provide an industrially useful high-molecular material, which can be prepared by a relatively simple process, which has a high heat resistance and specific surface area, which has no electroconductivity and incorporates high functionalities, such as adsorptivity and deodorizing property, and a preparation process thereof.

The present inventors have made investigations into high-molecular materials which have specific functionalities, such as adsorptivity and deodorizing property, as well as excellent heat resistance and strength, and finally found that a highly functional heat-resistant high-molecular material is obtained by heat-treating a sulfo-group-containing aromatic high-molecular compound under suitable conditions, leading to completion of the present invention.

The present invention provides a sulfo-group-containing heat-resistant high-molecular material containing not less than 1 wt. % of sulfo groups in terms of sulfur content and having an ammonia adsorptivity of not less than 10 mg/g, formed by heat-treating at a temperature of 250°–500° C. a starting composition composed mainly of a sulfo-group-containing aromatic high-molecular compound which comprises unit constituents of an aromatic sulfonic acid compound or a salt thereof and is soluble in aqueous solvents, and a process for preparing a sulfo-group-containing heat-resistant high-molecular material which comprises heat-treatment of a methylene type linkage-containing condensation product of an aromatic sulfonic acid compound or a salt thereof in a non-oxidizing atmosphere under such temperature conditions that the highest temperature is 250°–500° C.

The sulfo-group-containing heat-resistant high-molecular material of the present invention exhibits high heat resistance which enables the material to be used at a temperature in the range of 150°–350° C. as well as good thermal conductivity and ion exchange capacity. Further, it has a large specific resistance and also a specific surface area as large as 40 m$^2$/g measured by the CO$_2$BET method. Therefore, it has good adsorptivity characteristically, particularly for alkaline components including ammonia due to the presence of sulfo groups.

As described above, the sulfo-group-containing heat-resistant high-molecular material of the present invention incorporates high heat resistance and sufficient strength for practical use as well as high functionalities, so that it can be used in a variety of industrial fields as adsorbents, deodorants, filter media, flame retarding materials, ion exchangers and heat reserving materials or as components for miscellaneous composite materials.

In particular, it is preferably used as a member required to have heat resistance, corrosion resistance (chemical resistance) and flexibility as well as non-electroconductivity, that is, as a member to be used in the area where synthetic resins are insufficient in heat resistance or carbon materials are inadequate due to their electroconductivity, for example, as materials for a spacer of electrodes in a fuel cell.

The preparation process of the present invention offers an industrially advantageous process for producing materials having the foregoing characteristics.

FIG. is a graph illustrating the relationship between the heat treatment temperature and the contents of carbon, nitrogen and sulfur in the treated product.

Figure 2:
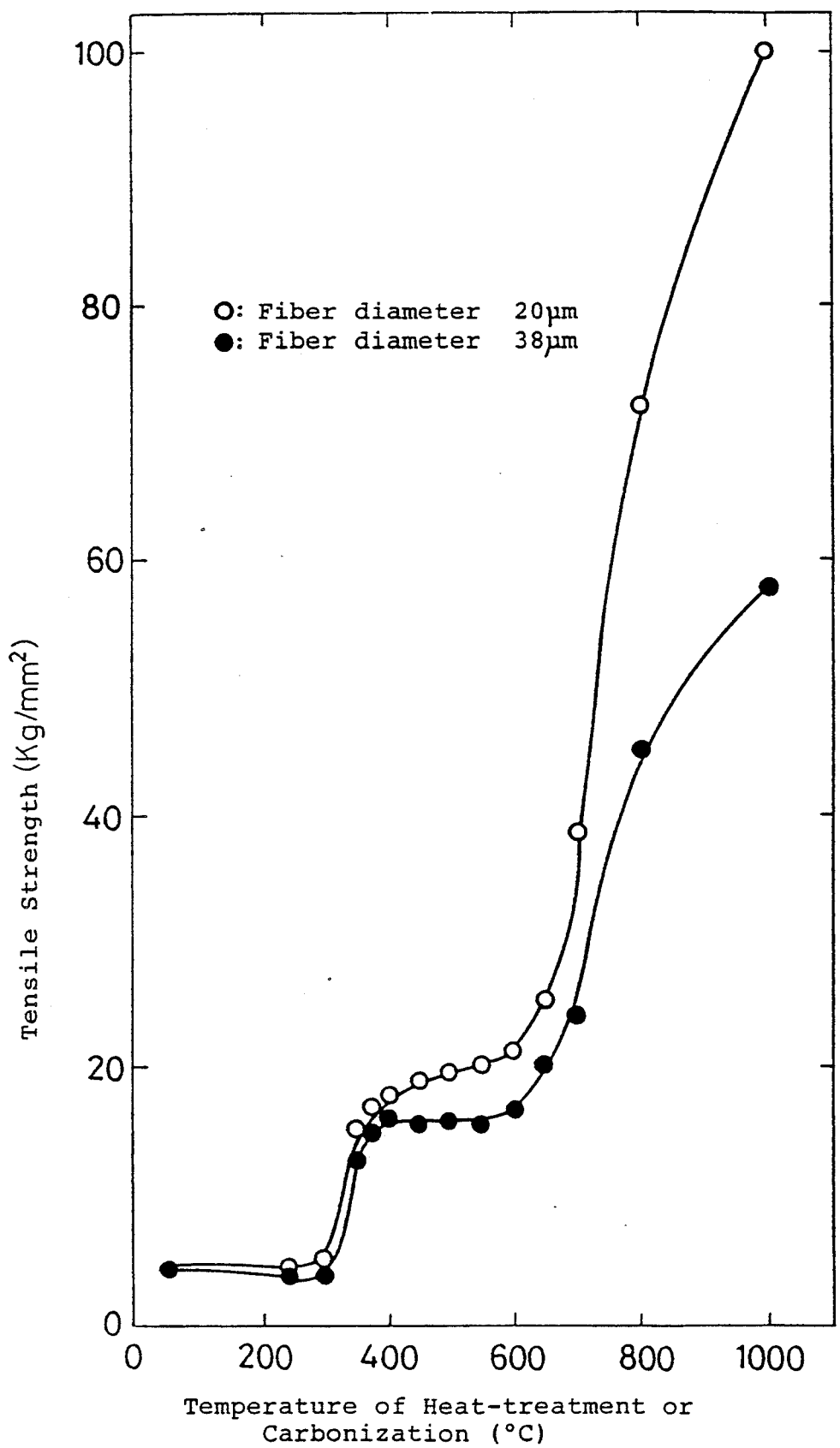

FIG. 2 is a graph illustrating the relationship between the heat treatment temperature and the strength of the treated product.

Figure 3:
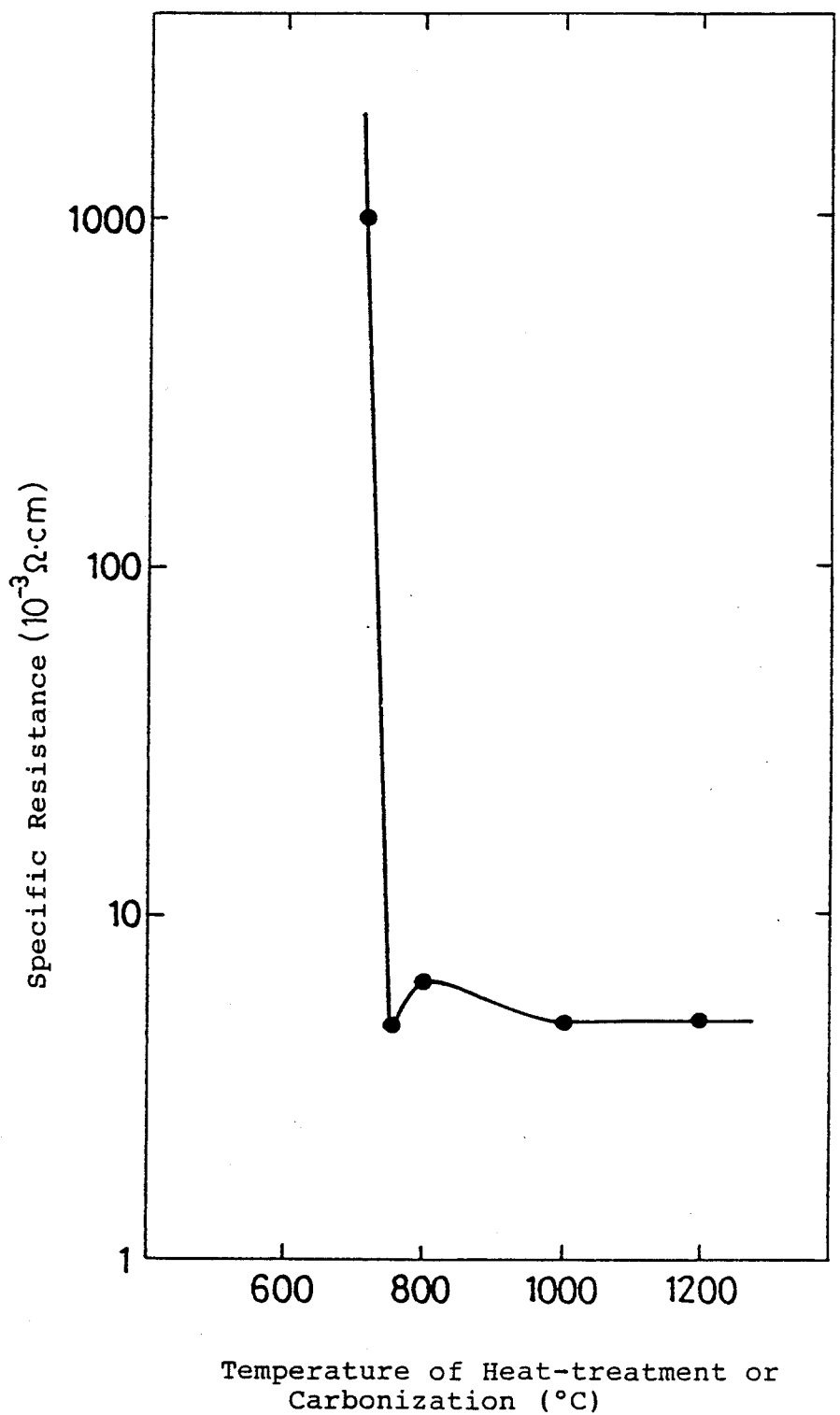

FIG. 3 is a graph illustrating the relationship between the heat treatment temperature and the specific resistance of the treated product.

BEST MODE FOR CARRYING OUT THE INVENTION

As a raw material for the sulfo-group-containing heat-resistant high-molecular material of the present invention, there is used a sulfo-group-containing aromatic high-molecular compound with a structure in which unit constituents, each comprising an aromatic sulfonic acid compound formed by replacing an average of 1 or 2 hydrogen atoms in an aromatic ring such as benzene or naphthalene with a sulfo group or a salt thereof, are linked successively via a certain bonding group. Although there is no particular limitation on the bonding group, it is preferable to use a bonding group represented by the formula

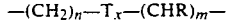

$$-(CH_2)_n-T_x-(CHR)_m-$$

wherein T represents a benzene or naphthalene ring, R represents hydrogen, a lower alkyl group or a benzene ring, and n, m, and x are individually an integer of 0 or 1 with the exception that n and m are not 0 at the same time, from the viewpoint of properties and ease of production and availability. Among others, $-CH_2-$ is particularly preferred. The sulfo-group-containing aromatic high-molecular compound, the raw material used in the present invention, contains an average of 1 or 2 sulfo-groups per unit constituent. The sulfo-group-containing aromatic high-molecular compound is usually obtained by the polymerization or condensation reaction of its unit constituents, either alone or together with such bonding group constituents as formaldehyde, paraformaldehyde, hexamethylenetetramine and other aldehydes. However, an increased proportion of a monomer having no sulfo group in the unit constituents may cause such operational troubles that a gel insoluble in aqueous solvents is formed upon the condensation or polymerization reaction. Besides, when the average number of sulfo-groups per unit constituent is less than one, sufficient exhibition of the effects of the present invention may not be expected. On the contrary, an increase in the proportion of a monomer containing more than 2 sulfo groups per unit constituent will obstruct the condensation or polymerization reaction and therefore disturb the production of the high-molecular compound. Further, when the average number of sulfo-groups per unit constituent exceeds two, the heat-resistant high-molecular material from the final heat treatment will unpreferably be brittle.

As the sulfo-group-containing aromatic high-molecular compound described above, it is also possible to use those sulfonated compounds obtained by treating an aromatic high-molecular compound containing no sulfo group with sulfuric acid, chlorosulfonic acid and the like. However, since the sulfo groups are desirably distributed therein as evenly as possible, it is preferable to use sulfo-group-containing aromatic high-molecular compounds obtained by condensing or polymerizing unit constituents each comprising an aromatic sulfonic acid compound. Preferred examples of the high-molecular compounds may include those formed by condensing naphthalenesulfonic acid, anthracenesulfonic acid and phenanthrenesulfonic acid obtained by sulfonating the corresponding aromatic compounds according to the processes known in the art, sulfonated products of a mixture of polycyclic aromatic compounds such as creosote oil, anthracene oil, tar and pitch, toluenesulfonic acid, xylenesulfonic acid, phenolsulfonic acids, a mixture thereof, or a salt thereof, with formaldehyde, paraformaldehyde, hexamethylenetetramine or other aldehydes; and methylene type linkage-containing polymers such as polystyrenesulfonic acid obtained by polymerizing an aromatic sulfonic acid having a vinyl group.

As the cation moieties to form the aromatic sulfonates $Na^+$, $K_+$, $Ca^{+2}$, $NH_4^+$, etc. may be mentioned. Of these sulfonates, ammonium salts are preferred in view of the ease of handling in heat treatment subsequent to spinning or molding. The preferred salts are dependent on the desired high-molecular materials. For instance, for the production of high-molecular materials requiring high strengths, the ammonium salts are preferred, whereas in the production of porous adsorbents or de-odorants, the salts of sodium, potassium, iron, calcium, etc. may be used, in addition to the ammonium salts. These sulfo-group-containing aromatic high-molecular compounds can be obtained with a variety of properties depending on the kind of aromatic compounds used as the raw material and the conditions of the sulfonation and condensation or polymerization reactions, and hence can be selectively used at will according to the characters of the intended sulfo-group-containing heat-resistant high-molecular materials.

These sulfo-group-containing aromatic high-molecular compounds may be used not only as a single composition but also in the form of a mixture of two or more of the condensation products, or copolymerization or copolycondensation products thereof. As an example of the sulfo-group-containing aromatic high-molecular compounds may be mentioned a formaldehyde condensation product of ammonium β-naphthalenesulfonate, which is a mixture of monomer and various polymers having polymerization degrees of up to about 200, and has a number-average molecular weight of about 800 to 50,000. The condensation product is a solid at room temperature, soluble in organic solvents such as benzene, toluene and acetone at low concentrations and easily soluble in aqueous solvents. The 60 wt. % aqueous solution has a viscosity of about 10–20,000 poise at 60° C. and has sufficient spinnability and moldability. The yield in the heat treatment of the condensation product at 250°–500° C. is approximately 95–55 wt. %.

The aforesaid high-molecular compound is only an example of the high-molecular compounds to be used in the present invention, and the sort of aromatic sulfonic acid compounds and/or salts thereof determines the range of the polymerization (polycondensation) numbers or of the number average molecular weights, which specifies the sulfo-group-containing aromatic high-molecular compounds that can be used in the present invention. For example, in the case of the condensation product of a sulfonated creosote oil, it is common to use a mixture of monomer and various polymers having polymerization degrees of up to 40, whose number average molecular weight is about 2,000 to 5,000, while in the case of the condensation product of phenanthrenesulfonic acid, a mixture of monomer and various polymers having polymerization degrees of up to about 30, whose number average molecular weight is about 2,500 to 5,000, is used. These sulfo-group-containing aromatic high-molecular compounds are dried and, if necessary, ground and graded, followed by heat treatment or dissolution or dispersion in solvents. The solutions or suspensions thus obtained are adjusted in viscosity as required, by way of dilution, concentration, etc., and then spun into fibers or molded into any desired forms such as bulky, colmnar, tabular, film-like and honeycomb forms. Thereafter, they are treated with heat to obtain sulfo-group-containing heat-resistant high-molecular materials in desired forms. The solvents used herein may preferably include water, alcohols such as methanol, organic acids such as acetic acid and polar solvents such as acetonitrile, in view of the characteristics of the sulfo-group-containing aromatic high-molecular compounds. Among others, water or aqueous solvents formed by mixing water and other water-soluble solvents are most suitable.

When fibrous or molded products are to be obtained in the preparation process of the present invention, it is useful to add a water-soluble high-molecular compound in an amount of from 0.02 to 20 parts by weight based on 100 parts by weight of the starting sulfo-group-containing aromatic high-molecular compound as a spinning or molding auxiliary. Thus, the spinnability or moldability of the starting composition can further be improved. The water-soluble high-molecular compounds used herein are those which are soluble in water or miscellaneous aqueous solvents, or dispersible therein as colloid. They may preferably include polyalkylene oxide type compounds such as condensation products of ethylene oxide, propylene oxide, etc. and condensation products of these compounds with alcohols, fatty acids, alkylamines or alkylphenols, polyvinyl compounds such as polyvinyl alcohol and polyvinyl pyrrolidone, polyacrylic acid type compounds such as polyacrylic acid, polyacrylamide, acrylic acid-acrylamide copolymers, etc. Among the sulfo-group-containing aromatic high-molecular compounds used as the principal raw material in the process of the present invention, polystyrenesulfonic acid and the like, which are highly soluble in water, may be used as the water-soluble high-molecular compound mentioned above.

The addition of these water-soluble compounds may effectively accelerate the rate of spinning, facilitate the handling of spun fibers or moldings prior to the heat treatment, and increase the strength of the resulting fibrous or molded high-molecular materials. When the amount of the water-soluble high-molecular compound added exceeds 20 parts by weight, an additional infusibilizing step will unfavorably be necessary because the fibers or the like are liable to fuse upon raising temperature or heating during the heat treatment.

Since the sulfo-group-containing aromatic high-molecular compounds used as a raw material in the preparation process of the present invention can be heat-treated without need for a prior infusibilizing treatment, they are particularly suitable for use in the production of fibrous heat-resistant high-molecular materials.

The starting composition composed mainly of the sulfo-group-containing high-molecular compound is subjected to heat treatment as granules or after being formed into fibrous or other desired shapes. The heat treatment is conducted by heating the composition in a non-oxidizing atmosphere in such a range that the highest temperature attains 250°–500° C, preferably 350°–400° C. Upon heating the starting composition, elimination of the sulfo groups begins to take place at a temperature in the vicinity of 250° C, and the starting composition, that is soluble in solvents such as water, is converted into a high-molecular material that is insoluble in the solvents, infusible and has strength enough to withstand handling as well as a high specific surface area and adsorptivity.

It is assumed that during the heat treatment, three dimensional crosslinking and improvement of surface properties proceed following the elimination of volatile matter, and the presence of the sulfo groups promotes these proceedings.

Figure 1:
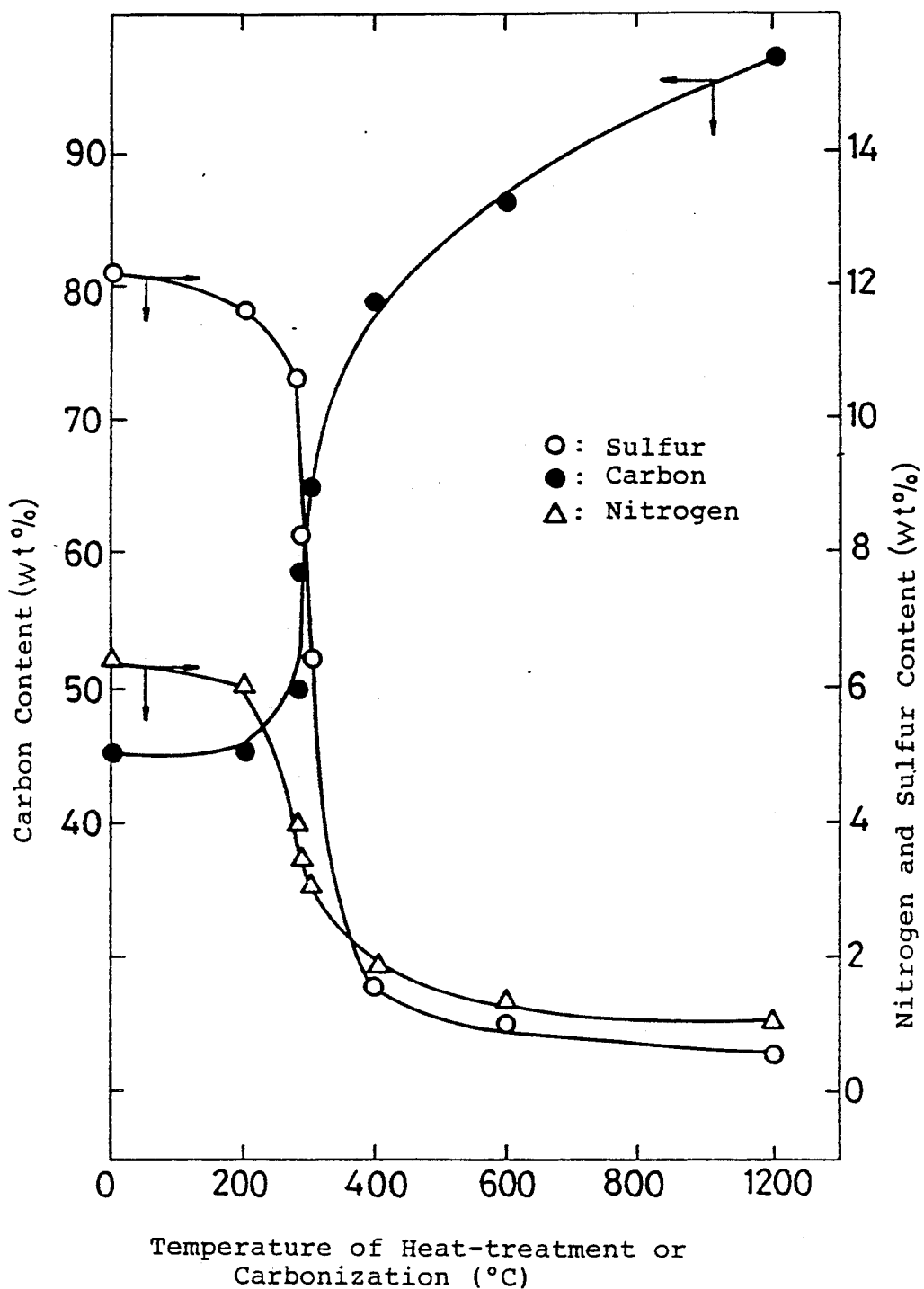
FIGS. 1 to 3 are graphs in each of which an example of variation in a physical property is illustrated upon heating a starting composition, prepared by forming a formaldehyde condensation product of ammonium β-naphthalenesulfonate, into a fibrous material.

The variations of the physical properties upon heating the starting composition, composed mainly of the sulfo-group-containing aromatic high-molecular compound, are as illustrated in FIGS. 1 to 3, typically with respect to a starting composition of fibrous form prepared from a formaldehyde condensation product of ammonium β-naphthalenesulfonate. As will be discussed below, since the chemical reaction taking place upon heating is endothermic and the variations of the physical properties are hardly affected by the rate of raising temperature, the drawings are given in terms of the relationship between the temperature of the heat treatment or carbonization and each of the physical properties.

FIG. 1 is a graph illustrating the variations of the contents of carbon, nitrogen and sulfur in the material. As seen in the graph, the contents of carbon, nitrogen and sulfur in the material become practically constant at a heat treatment temperature of between 600° and 700° C., and further heating causes a gradual increase of carbon and a gradual decease of nitrogen and sulfur owing to the progress of carbonization.

FIG. 2 shows the variations of strength caused by heat treatment, illustrating that the exhibition of strength of the material occurs in two stages. The first stage takes place primarily with the progress of three dimensional crosslinking in heat treatment at 300°–500° C., while the second stage is exhibited by carbonization above 600°–700° C.

FIG. 3 is a graph showing the variation of specific resistance with heat treatment temperature. From this drawing, it is found that since carbonization does not take place in heat treatment below 600° C., the resulting material is a non-conductor with little ability of conducting electricity, but by heating above 700° C., carbonization proceeds to transform the material to a good conductor.

As described above, the properties of the material obtained by heat-treating a sulfo-group-containing aromatic high-molecular compound vary significantly at around 600° C. The heat-resistant high-molecular materials of the present invention which are formed by heat-treatment below 500° C exhibit the properties of organic matter and hence differ from the carbides obtained by heat treatment at higher temperature.

Further, the heating up to 400° C. of the starting composition conducted in an oxygen-containing atmosphere accelerates the formation of functional groups such as carbonyl and carboxyl on the surface of the material, thus efficiently imparting the material such functionalities as adsorptivity and deodorizing property.

The optimum heat treatment conditions vary with the properties of the starting composition and the desired sulfo-group-containing heat-resistant high-molecular material. However, they may properly be determined in such a way that the highest temperature lies between 250° C. and 500° C. and the product still holds 10–90% of the sulfo groups contained in the starting composition and hence contains sulfo groups in an amount of not less than 1 wt. % in terms of sulfur content. If the highest temperature is less than 250° C., the heat treating effects will be insufficient and strength will also be undesirably low. If the starting composition is heat-treated beyond 400° C. in an oxygen-containing atmosphere or beyond 500° C. even in a non-oxidizing atmosphere, the strength of the product increases. However, most of the sulfo groups contained in the starting composition are stripped off during heat-treatment, and the product does not exhibit the characteristic effects of sulfo groups.

The chemical reaction in the heat treatment step of the present invention is endothermic and hence does not impose any particular limitations on the rate of raising temperature during heat treatment. However, when the water formed by thermal decomposition attaches to the starting composition, the composition becomes liable to partial dissolution, adhesion, deformation, etc. Therefore, it is desirable to carry out the heat treatment under conditions capable of rapid removal of the thermal decomposition gas, for example, in a stream of a carrier gas or under reduced pressure.

When a fibrous product is produced, it is effective for the improvement of strength to exert a tensile force on the composition during heat treatment.

The sulfo-group-containing heat-resistant high-molecular materials of the present invention are those containing sulfo groups in an amount of not less than 1 wt. % in terms of sulfur content, having a specific surface area of not less than 40 $m^2/g$ measured by the $CO_2BET$ method, having an ammonia adsorptivity of not less than 10 mg/g, and which do not cause substantial weight reduction up to 250° C. They are lustrous, yellow or black, highly heat-resistant and corrosion-resistant (chemical-resistant) high-molecular materials. Another characteristic of the sulfo-group-containing heat-resistant high-molecular material is that its electric conductivity is low owing to its large specific resistance of $10^8 \Omega \cdot cm$. These characteristics make it possible to provide a material which requires a high heat resistance up to 250° C. and corrosion resistance and is suitable for members that should not have electric conductivity. It is also possible to impart flexibility to the material by forming it into a fibrous product. However, when as the raw material a salt of aromatic sulfonic acids is used, the cationic moiety of which does not volatilize during heat treatment, e.g., a Na salt, the resultant material sometimes has a hygroscopic property and exhibits lower specific resistance due to the water adsorbed. These physical properties vary in accordance with the kind of starting compositions, heat treatment conditions, shape of the products, etc. An example of the fibrous products teaches that the strength increases with a rise in heat treatment temperature, giving a value of 15–50 $kg/mm^2$ by heat treatment at 350°–450° C. in a stream of nitrogen. The specific surface area of the fibers also increases with increasing heat treatment temperature, giving a value of 50–200 $m^2/g$ for a 350° C.-heat-treated product and approximately 250 $m^2/g$ for a 450° C.-heat-treated product, as measured by the $CO_2BET$ method.

The present invention will be illustrated more specifically with reference to the following examples.

EXAMPLE 1

To 1,280 g of refined naphthalene was added 1050 g of 98% sulfuric acid, and the naphthalene was sulfonated by reaction at 155° C. for 3 hours. The resulting mixture was distilled under reduced pressure to remove from the system the unreacted naphthalene and the water formed by the reaction. The composition of the sulfonated product was: β-naphthalenesulfonic acid=96.2 wt. %; α-naphthalenesulfonic acid=not detected; naphthalenepolysulfonic acid=3.0 wt. %; and unreacted naphthalene=0.8 wt. %. Thereafter, the sulfonated product was combined with 1,000 ml of water and then with 857 g of 35% aqueous formaldehyde. They were reacted at 105° C. for 8 hours and neutralized with ammonia. Insoluble matter was separated therefrom by filtration and the filtrate was concentrated to obtain an aqueous solution of a formaldehyde condensation product of β-naphthalenesulfonic acid with a number average molecular weight of 3,820, the solution containing 45 wt. % of water and having a viscosity of 1,000 poise at 32° C.

The aqueous solution as a raw material was subjected to dry spinning using a spinneret of 0.1 mm in diameter. The resulting spun fiber was put in a vessel at a bulk density of 0.025 $g/cm^3$, charged in a furnace kept at 250° C., and raised in temperature in a stream of nitrogen at a rate of 20° C./min to a predetermined temperature, at which it was kept for a predetermined period of time for its heat treatment. The properties of the heat-treated products thus obtained are given in Table 1.

The 375° C.-heat-treated product given in Table 1 was allowed to adsorb ammonia, then to desorb the ammonia at 180° C, and to adsorb ammonia again at room temperature. Ammonia was adsorbed therein in an amount of 34.3 mg/g. The same sample was then allowed to desorb the ammonia at 250° C., and to adsorb ammonia again, with the result that 34.9 mg/g of ammonia was adsorbed. Thus, it was found that repeated use of the products was feasible by heat regeneration.

TABLE 1

| | Heat treating conditions | | Tensile strength $(kg/mm^2)$ | Elongation (%) | Fiber diameter (μm) | Surface area | | Sulfur content (wt %) | Bunde static method $NH_3$ adsorptn. room temp. (mg/g) | Solubility to water | Color tone | Specific resistance (Ω · cm) |
|---|---|---|---|---|---|---|---|---|---|---|---|---|
| | Temp. (°C.) | Time (min) | | | | $N_2BET$ method $(m^2/g)$ | $CO_2BET$ method $(m^2/g)$ | | | | | |
| Raw | 25 | — | 2.40 | 14.8 | 30 | | | 13.5 | | Soluble | yellow | |

TABLE 1-continued

| | Heat treating conditions | | Tensile strength (kg/mm$^2$) | Elongation (%) | Fiber diameter (μm) | Surface area | | Sulfur content (wt %) | Bunde static method NH$_3$ adsorptn. room temp. (mg/g) | Solubility to water | Color tone | Specific resistance (Ω·cm) |
|---|---|---|---|---|---|---|---|---|---|---|---|---|
| | Temp. (°C.) | Time (min) | | | | N$_2$BET method (m$^2$/g) | CO$_2$BET method (m$^2$/g) | | | | | |
| material Example | 255 | 120 | 7.20 | 12.8 | 28 | 0.6 | 82 | 6.2 | 42.4 | insoluble | black | 10$^8$ or more |
| | 325 | 1 | 8.98 | 12.7 | 27 | 0.3 | 62 | 6.6 | 49.9 | " | " | " |
| | 350 | 0.5 | 24.9 | 11.4 | 25 | 1.0 | 80 | 5.2 | 38.4 | " | " | " |
| | 375 | 0.5 | 28.4 | 8.9 | 24 | 0.8 | 113 | 2.7 | 36.5 | " | " | " |
| | 400 | 0.25 | 31.4 | 8.8 | 23 | 0.7 | 214 | 4.2 | 23.9 | " | " | " |
| | 450 | 0.25 | 31.5 | 6.7 | 23 | | | 2.4 | | " | " | " |
| | 500 | 0.25 | 32.2 | 6.7 | 22 | 1.0 | 210 | 1.3 | 16.3 | " | " | " |
| Reference Example | 600 | 0.02 | 19 | 4.6 | 34.0 | | | 0.8 | | " | " | 6.1 × 10$^7$ |
| | 700 | 0.02 | 19 | 4.0 | 52.0 | 2.2 | 225 | 0.7 | 6.2 | " | " | 5.3 × 10$^4$ |

EXAMPLE 2

To 1,420 g of naphthalene oil (composition: a lower boiling distillate than naphthalene boiling point=4.2 wt. %; naphthalene=28.4 wt. %; β-methylnaphthalene=49.0 wt. %; α-methylnaphthalene=12.1 wt. %; an intermediate boiling distillate between naphthalene and α-methylnapthahlene=4.0 wt. %; and a higher boiling distillate than α-methylnaphthalene boiling point=4.3 wt. %) was added 1,200 g of 98% sulfuric acid. The naphthalene oil was sulfonated by reaction at 150° C. for 3 hours. The resulting mixture was distilled under reduced pressure to remove from the system the unreacted oil and the water formed by the reaction. Thereafter, the sulfonated oil was combined with 500 g of water and then with 857 g of 35% aqueous formaldehyde. They were reacted at 105° C. for 15 hours, and then calcium hydroxide was added thereto in an amount of 0.9-equivalent to the residual sulfuric acid, thereby removing the sulfuric acid as gypsum by filtration. The filtrate was neutralized with ammonia and subjected to evaporation at 105° C. for 2 hours. Based on the solid residue thus obtained, 0.5 wt. % of polyethylene glycol (manufactured by Seitetsu Chemical Industries Co., Ltd.; trade name: PEO-3; average molecular weight: 600,000–1,100,000) was added as an aqueous solution. The resultant mixture was adjusted in water content to obtain a starting composition containing 38 wt. % of water and having a viscosity of 10,000 poises at 80° C., the composition being composed mainly of a formaldehyde condensation product of sulfonated naphthalene oil, the solid matter of which composition contains 13.6 wt. % of sulfo groups in terms of sulfur content. The starting composition was subjected to an extruder at 80° C. to form it into a honeycomb-shaped molded article. The molded article was then raised in temperature at a rate of 10° C./min in a stream of air under a reduced pressure of 50 Torr from room temperature to 375° C., at which it was kept for 15 minutes for its heat treatment.

The honeycomb molded article thus obtained was black and contained 4.4 wt. % of sulfo groups in terms of sulfur content. It was insoluble in solvents and infusible and had a surface area of 1.0 m$^2$/g according to the N$_2$BET method and that of 75 m$^2$/g according to the CO$_2$BET method. Its adsorption of ammonia was 35 mg/g, while the specific resistance was 10$^8$Ω·cm or more, at room temperature.

The honeycomb molded article was immersed in a 1 wt. % aqueous NaCl solution in an autoclave and treated under the conditions of 20 atmospheres and 150° C. Its ion exchange capacity was measured to be 2.4 meq/g, showing good performance as an ion exchanger.

EXAMPLE 3

The 325° C.-heat-treated black fiber obtained in Example 1 was packed in a 120×40×40 mm mold at a density of 0.136 g/cm$^3$ and treated with heat for 5 minutes in a furnace at 350° C. The resulting molded article was a rectangular parallelopiped with dimensions of 120×40×38 mm and a density of 0.134 g/cm$^3$ and contained 5.2 wt. % of sulfo groups in terms of sulfur content. Its heat conductivity was 0.045 W/m·k, exhibiting good thermal conduction, while the specific resistance was 10$^8$ Ω·cm or more.

We claim:

1. A sulfo-group-containing heat-resistant high-molecular material containing sulfo groups in an amount of not less than 1 wt. % in terms of sulfur content and having an ammonia adsorptivity of not less than 10 mg/g, formed by heat-treating at a temperature of 250°–500° C. a starting composition composed mainly of a sulfo-group-containing aromatic high-molecular compound which comprises unit constituents of an aromatic sulfonic acid compound or a salt thereof and is soluble in aqueous solvents.

2. A fibrous sulfo-group-containing heat-resistant high-molecular material containing sulfo groups in an amount of not less than 1 wt. % in terms of sulfur content and having an ammonia adsorptivity of not less than 10 mg/g, formed by adjusting the viscosity of an aqueous solvent solution of a starting composition composed mainly of a sulfo-group-containing aromatic high-molecular compound which comprises unit constituents of an aromatic sulfonic acid compound or a salt thereof and is soluble in aqueous solvents, spinning the resulting solution into a fibrous material, and heat-treating the fibrous material at a temperature of 250°–500° C.

3. A fibrous sulfo-group-containing heat-resistant high-molecular material containing sulfo groups in an amount of not less than 1 wt. % in terms of sulfur content and having an ammonia adsorptivity of not less than 10 mg/g and a specific resistance of not less than 10$^8$ Ω·cm, formed by adjusting the viscosity of an aqueous solvent solution of a starting composition composed mainly of a sulfo-group-containing aromatic high-molecular compound which comprises unit constituents of an ammonium salt of an aromatic sulfonic acid compound and is soluble in aqueous solvents, spinning the resulting solution into a fibrous material and heat-treating the fibrous material at a temperature of 250°–500° C.

4. A molded sulfo-group-containing heat-resistant high-molecular material containing sulfo groups in an amount of not less than 1 wt. % in terms of sulfur content and having an ammonia adsorptivity of not less than 10 mg/g, formed by adjusting the viscosity of an aqueous solvent solution of a starting composition composed mainly of a sulfo-group-containing aromatic high-molecular compound which comprises unit constituents of an aromatic sulfonic acid compound or a salt thereof and is soluble in aqueous solvents, molding the resulting solution and heat-treating the molded article at a temperature of 250°–500° C.

5. A process for preparing the sulfo-group-containing heat-resistant high-molecular material according to any one of claims 1 through 4, which comprises heat-treating a starting composition composed mainly of a methylene type linkage-containing condensation product of an aromatic sulfonic acid compound or a salt thereof in a non-oxidizing atmosphere under such a temperature condition that the highest temperature is 250°–500° C.

6. A process for preparing the sulfo-group-containing heat-resistant high-molecular material according to any one of claims 1 through 4, which comprises heat-treating a starting composition composed mainly of a methylene type linkage-containing condensation product of an aromatic sulfonic acid compound of a salt thereof in an oxygen-containing atmosphere under such a temperature condition that the highest temperature is 250°–400° C. and then, if necessary, heat-treating the resulting composition in a non-oxidizing atmosphere under such a temperature condition that the highest temperature is 250°–500° C.

7. The process for preparing the sulfo-group-containing heat-resistant high-molecular material according to claim 5 wherein a mixture obtained by adding 0.02–20 parts by weight of a water-soluble high-molecular compound to 100 parts by weight of the methylene type linkage-containing condensation product of an aromatic sulfonic acid compound or a salt thereof is used as the starting material.

8. The process for preparing the sulfo-group-containing heat-resistant high-molecular material according to claim 5 wherein the heat treatment is carried out under reduced pressure.

9. The process for preparing the sulfo-group-containing heat-resistant high-molecular material according to claim 6 wherein a mixture obtained by adding 0.02–20 parts by weight of a water-soluble high-molecular compound to 100 parts by weight of the methylene type linkage-containing condensation product of an aromatic sulfonic acid compound or a salt thereof is used as the starting material.

10. The process for preparing the sulfo-group containing heat-resistant high-molecular material according to claim 6 wherein the heat treatment is carried out under reduced pressure.

11. The process for preparing the sulfo-group-containing heat-resistant high-molecular material according to claim 7 wherein the heat treatment is carried out under reduced pressure.

* * * * *